(12) United States Patent
Boulet et al.

(10) Patent No.: US 10,658,948 B2
(45) Date of Patent: May 19, 2020

(54) DC/AC ELECTRICAL POWER CONVERTER DEVICE FOR A VARIABLE-SPEED MOTOR AND A HIGH-SPEED MOTOR

(71) Applicant: SAFRAN ELECTRICAL & POWER, Blagnac (FR)

(72) Inventors: Guillaume Boulet, L'isle Jourdain (FR); Wenceslas Bourse, Beauzelle (FR); Pascal Rollin, Daux (FR); Jeremy Cuenot, Blagnac (FR); Regis Bernard Albert Meuret, La Rochette (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 16/093,080

(22) PCT Filed: Apr. 11, 2017

(86) PCT No.: PCT/FR2017/050871
§ 371 (c)(1),
(2) Date: Oct. 11, 2018

(87) PCT Pub. No.: WO2017/178752
PCT Pub. Date: Oct. 19, 2017

(65) Prior Publication Data
US 2019/0165694 A1     May 30, 2019

(30) Foreign Application Priority Data

Apr. 12, 2016 (FR) .................................. 16 53217

(51) Int. Cl.
*H02M 7/5395* (2006.01)
*H02P 27/08* (2006.01)
(Continued)

(52) U.S. Cl.
CPC .......... *H02M 7/5395* (2013.01); *F04D 25/06* (2013.01); *H02M 1/12* (2013.01); *H02M 1/126* (2013.01);
(Continued)

(58) Field of Classification Search
CPC ....... H02M 7/5395; H02M 2001/0054; H02M 1/126; H02P 27/08; F04D 25/06
See application file for complete search history.

(56) References Cited

U.S. PATENT DOCUMENTS

| | | | |
|---|---|---|---|
| 2007/0247091 A1* | 10/2007 | Maiocchi | H02M 3/156 318/400.04 |
| 2008/0013351 A1* | 1/2008 | Alexander | H02M 3/1582 363/123 |

(Continued)

FOREIGN PATENT DOCUMENTS

| | | |
|---|---|---|
| EP | 1 887 680 A2 | 2/2008 |
| WO | WO 2015/060000 A1 | 4/2015 |

OTHER PUBLICATIONS

International Search Report dated Jun. 9, 2017 in PCT/FR2017/050871 filed Apr. 11, 2017.

*Primary Examiner* — Kawing Chan
*Assistant Examiner* — Bradley R Brown
(74) *Attorney, Agent, or Firm* — Oblon, McClelland, Maier & Neustadt, L.L.P.

(57) ABSTRACT

A DC/AC electrical power converter device having inlet terminals for electrically connecting to a DC electricity power supply network, outlet terminals for electrically connecting to an electric motor, a chopper electrical converter coupled to the inlet terminals, and an electrical inverter coupled between the chopper electrical converter and the outlet terminals. The converter device further includes a control unit for controlling the electrical inverter and that is configured to operate using pre-calculated pulse width (Continued)

modulation with pre-calculated unchanging switching instants for the controlled switches of the electrical inverter regardless of the frequency of rotation of the motor and of the voltage of the electricity network for connection to the device.

8 Claims, 3 Drawing Sheets

(51) Int. Cl.
      *F04D 25/06*       (2006.01)
      *H02M 1/12*       (2006.01)
      *H02M 1/00*       (2006.01)

(52) U.S. Cl.
      CPC ....... *H02P 27/08* (2013.01); *H02M 2001/007* (2013.01); *H02M 2001/0054* (2013.01)

(56) References Cited

U.S. PATENT DOCUMENTS

| | | | |
|---|---|---|---|
| 2008/0037300 A1* | 2/2008 | Kataoka | H02M 1/08 363/56.01 |
| 2010/0157632 A1* | 6/2010 | Batten | H02M 7/4807 363/74 |
| 2016/0285380 A1 | 9/2016 | Toda et al. | |

* cited by examiner

DC/AC ELECTRICAL POWER CONVERTER DEVICE FOR A VARIABLE-SPEED MOTOR AND A HIGH-SPEED MOTOR

BACKGROUND OF THE INVENTION

The invention relates to a direct current to alternating current (DC/AC) power converter device optimized for variable-speed motors or for very high-speed motors for use in applications of the aviation compressor type, and also for applications of the aviation ventilation type.

The use of very high-speed motors, such as motors operating at more than 100,000 revolutions per minute (rpm) enables the size and the weight of the motor to be reduced significantly, thereby making it easier to integrate in equipment.

Nevertheless, the use of a motor of this type imposes major constraints on the electronic DC/AC converter controlling the motor, constraints that conventional control structures find difficult to address in an aviation environment.

Traditionally, a sinewave control inverter that is subjected to pulse width modulation control (DC/AC converter) is used for controlling the current in a variable-speed motor. Such control requires a switching or "chopping" frequency that is much higher than the electrical frequency of the motor, such as for example a chopping frequency that is ten to 25 times the electrical frequency of the motor. The electrical frequency is the product of the mechanical frequency of the motor multiplied by the number of pole pairs of the motor.

Controlling high-speed machines with sinusoidal control then requires the use of a power converter or "inverter" having a chopping frequency that is very high, thereby leading to a large number of technical challenges to be addressed, in particular relating to:
- a very great increase in losses in power semiconductors;
- better adapted traditional cooling means, thereby leading to additional difficulty in integrating the DC/AC converter; and
- a technical break needed compared with present technology, given that a large band-gap semiconductor is needed and that isolated grid bipolar transistors (IGBTs) are not suitable.

An alternative to sinusoidal control is to control the inverter with so-called "120°" control, thus making it possible to divide by six the number of switching operations performed by each switch, while maintaining the same chopping frequency. This is due to the fact that a single switch chops during $\frac{1}{6}^{th}$ of the electrical period.

This kind of control improves switching losses in the power components, but degrades the quality of the current supplied to the motor, in particular because of the high level of harmonics, and leads to other constraints such as:
- greater pulsation in the motor torque, with a risk of exciting resonant modes (shaft line, . . . );
- degraded power factor and the appearance of harmonics at the inlet of the equipment; and
- a risk of increasing the volume of the filters and of reinforcing mechanical parts on the shaft line.

Furthermore, even with "120°" type control, the choice of chopping frequency remains associated with the electrical frequency of the motor.

Power conversion circuits are known in the prior art that comprise an inverter coupled downstream from a synchronous rectification DC/AC converter, also referred to as pulse amplitude modulation (PAM), which may be of the voltage lowering type ("buck"), of the voltage raising type ("boost"), or of the voltage lowering and raising type ("buck-boost").

Such power converter circuits allow full-wave operation of the inverter and present the advantage of reducing losses in the converter circuit, and in particular in the inverter.

The circuit serves to dissociate the voltage-reducing function form the function of generating a stator frequency proportional to the mechanical frequency of the motor.

The role of the DC/DC converter is to impose a mean output voltage from the converter device, and thus, when the device is connected to a motor, to impose a mean voltage across the terminals of the motor in order to set its speed. Adjusting the output voltage of the buck DC/DC converter thus serves to control the speed of the motor.

An inverter, a DC/AC converter, serves to switch current through the phases of the motor at the electrical frequency of the motor. It does not modify the mean amplitude of the voltage of the motor.

Thus, when the converter device is connected to an electric motor, the device makes it possible to have a chopping frequency for the DC/DC converter that is independent of the electrical frequency of the motor to which the converter device is coupled.

The inverter operates with an inlet voltage that is controlled by the DC/DC converter and that is no longer directly subjected to voltage variations in the electricity network. This makes it possible to optimize the choice of power components in the inverter, and losses in the power semiconductors.

Nevertheless, such converter circuits generate additional harmonics in the motor and thus torque pulsation. This generation of additional harmonics can excite resonant modes and generate additional mechanical stresses.

OBJECT AND SUMMARY OF THE INVENTION

The invention seeks to provide a DC/AC electrical power converter device in which the chopping frequency of the converter is decoupled from the electrical frequency of the motor to which the device is to be electrically connected, and serving to eliminate a major portion of the harmonics that disturb the operation of an electric machine coupled to the outlet of the device.

The invention firstly provides a DC/AC electrical power converter device having inlet terminals for electrically connecting to a DC electricity power supply network, outlet terminals, for electrically connecting to an electric motor, a chopper electrical converter coupled to said inlet terminals and an electrical inverter coupled between the chopper electrical converter and said outlet terminals.

According to a general characteristic of the invention, the power converter device further comprises a control unit for controlling the inverter and that is configured to operate using pre-calculated pulse width modulation with pre-calculated unchanging switching instants for the controlled switches of the electrical inverter regardless of the frequency of rotation of the motor and of the voltage of the electricity network for connection to said device.

The power converter device thus provides a compromise between pulse amplitude modulation, which reduces the number of switching operations but increases the magnitudes of harmonic currents; and sinusoidal type control, which reduces the magnitudes of current harmonics but presents a very large number of switching operations.

Specifically, the fact that the inverter operates with an inlet voltage that is controlled by the DC/DC converter and that is no longer subjected directly to voltage variations in the electricity network means that it is possible to use pre-calculated and constant pulse width modulation for controlling it in order to eliminate certain current harmonics from the phases of the motor.

Operating the DC/AC inverter with pre-calculated pulse width modulation leads to controlling switching instants on the basis of pre-calculated unchanging instants so as to eliminate certain harmonics from the current supplied to the motor. For example, by adding two additional switching operations per switch over one electrical period at respective pre-calculated instants, it is possible to eliminate harmonics 3, 5 and 7 that would appear with conventional "120°" type control.

This principle simplifies the design of the voltage converter considerably for high-speed synchronous machines, i.e. machines operating at speeds greater than 30,000 rpm or at an electrical frequency greater than 1 kilohertz (kHz).

This pre-calculated control technique imposes unchanging control angles regardless of the frequency of rotation of the motor and regardless of the voltage of the electricity network for connection to said device.

Selecting which harmonics to reject serves to optimize the gain of the inlet filtering to the power converter device, to achieve savings in terms of motor efficiency, to reduce ripple in the torque that is generated, and to eliminate frequencies that are critical on mechanical portions of the motor coupled to the outlet of the power converter device, such as its rotor and its bearings.

In addition, such so-called "pre-calculated" control is easier to implement on an inverter than is sinewave type control, since fewer hardware resources are needed. Specifically, when using sinewave type control, the hardware resources needed, must normally perform Park and Concordia or Clark transforms, and it is also necessary to have two motor current sensors, with continuous information about the position of the rotor. In contrast, when using pre-calculated control, only one current sensor is necessary, together with a simple calculation unit for calculating the switching moments with information that is discrete (e.g. once every 60° electrical).

Compared with sinusoidal control, the power converter device of the invention presents the following advantages:
  the speed of rotation of the motor is less constraining for the power electronics, thus making it possible to connect motors presenting a greater number of pairs of electrical poles;
  the electric motor is subjected to a voltage with less chopping, thereby reducing iron losses in the motor and common mode current drained by the capacitances of the stator and the risk of partial discharge; and
  control is simpler since it does not require real-time calculation, given that it is pre-calculated while designing the power converter device and is stored in the control unit.

Compared with "120°" control, the power converter device of the invention presents the following advantages:
  eliminating the main current harmonics in the motor (3, 5, 7, . . . );
  saving on filtering the input current;
  decreasing the risk of mechanical resonance; and
  reducing losses due to reducing the number of switching operations, if it suffices to eliminate only harmonics 3, 5, and 7.

The power converter device of the invention also presents the following advantages both compared with "120°" type control and compared with sinusoidal control:

the power switches of the chopper electrical converter and of the inverter can be optimized separately, thus making it possible to achieve a better compromise between speed, losses, maximum voltage, and robustness; and
  there is no chopping in the inverter, which facilitates implementing control without having a rotor position sensor.

In an aspect of the power converter device, the chopper electrical converter has buck type topology.

In a first variant, the chopper electrical converter has boost type topology.

In a second variant, the chopper electrical converter has buck-boost type topology.

The topology of the converter is selected as a function of the voltage level of the power supply network to which the device is to be connected and as a function of the speed needed for operation of the electric motor to which the device is to be connected.

Secondly, the invention provides a motor system comprising a DC electricity power supply network, an electric motor, and a DC/AC electrical power converter device electrically connected between the electricity power supply network and the electric motor.

In an aspect of the motor system, the electric motor may be a fuel cell compressor.

BRIEF DESCRIPTION OF THE DRAWINGS

The invention can be better understood on reading the following description given by way of non-limiting indication and with reference to the accompanying drawings, in which.

DETAILED DESCRIPTION OF EMBODIMENTS

Figure 1:
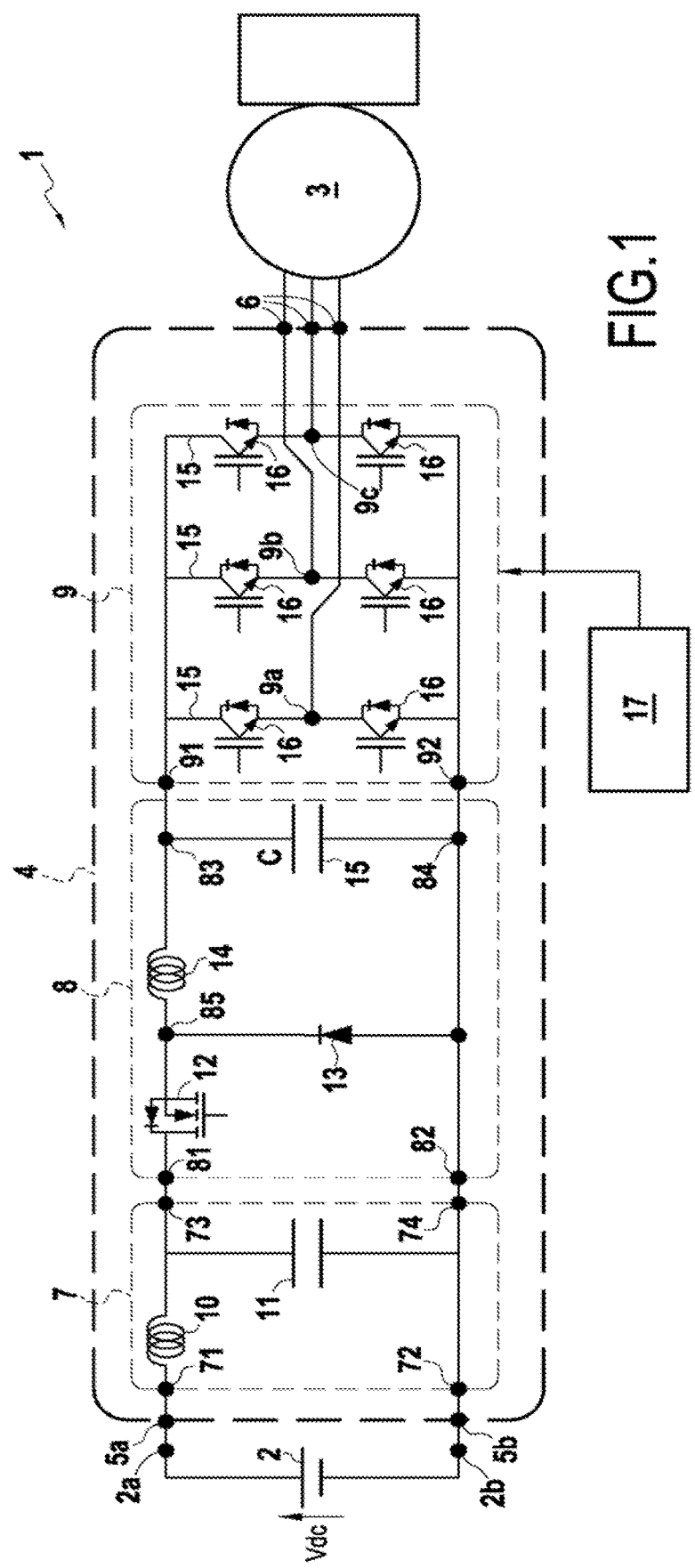
FIG. 1 is a diagram of a motor system including a power converter device in an embodiment of the invention.

FIG. 1 is a diagram of a motor system including a power converter device in an embodiment of the invention.

The motor system 1 comprises a DC electrical power supply network 2, such as a power supply network on board an aircraft, for example, a rotary electric machine 3 corresponding in this example to a high-speed three-phase electric motor, and an electrical DC/AC power converter device 4.

The converter device 4 has two inlet terminals 5a and 5b that are electrically connected to two connection terminals 2a and 2b of the DC power supply network 2, and three outlet terminals 6 that are electrically coupled to the three coupling terminals of the electric motor 3.

The device 4 also has a filter stage 7, a chopper buck stage 8, and an inverter stage 9. The buck stage 8 has its inlet coupled to the inlet terminal 5 of the converter device 4 via the filter stage 7. The filter stage 7 is thus coupled between the inlet terminals 5a and 5b and the buck stage 8. The inverter stage 9 is coupled firstly at its outlet to the outlet terminal 6 of the converter device, and secondly at its inlet to the outlet from the buck stage 8. The buck stage 8 is thus electrically coupled between the filter stage 7 at its inlet and the inverter stage 9 at its outlet.

The filter stage 7 has a so-called "LC" circuit including a filter coil 10 and a filter capacitor 11.

The filter coil 10 is coupled between a first inlet terminal 71 and a first outlet terminal 73 of the filter stage 7, the first inlet terminal 71 of the filter stage 7 being coupled to the first connection terminal 2a of the power supply network via the first connection terminal 5a, and the first outlet terminal 73 of the filter stage 7 being coupled to a first inlet terminal 81 of the buck stage 8. The filter capacitor 11 is coupled between the first outlet terminal 73 of the outlet stage 7 and the inlet and the outlet second terminals 72 and 74 of the outlet stage 7 which are coupled together to the second connection terminal 2b of the DC power supply network 2 via an inlet terminal 5b of the converter device 4 and to a second inlet terminal 82 of the buck stage 8.

The buck stage 8 includes a controlled switch 12 that may make use of metal oxide on silicon field effect transistor (MOSFET), IGBT, or bipolar technology, a transistor 13 (which could be a diode as shown in the example shown in FIG. 1), an inductor 14, and a bus 15 possessing capacitance C.

The bus 15 is coupled between first and second outlet terminals 83 and 84 of the buck stage 8, the second outlet terminal 84 being coupled to ground, i.e. to the second connection terminal 2b of the DC power supply network 2, and thus to the second inlet terminal 82.

The controlled switch 12 and the inductor 14 are coupled in series between the first inlet terminal 81 and the first outlet terminal 83 of the buck stage 8, the controlled switch being connected directly to the first inlet terminal 81 and the inductor being connected directly to the first outlet terminal 83.

The first terminal of the diode 13 is connected to the connection node 85 coupling together the controlled switch 12 and the inductor 14, and the second terminal of the diode 13 is connected to the second inlet 82 and to the second outlet 84 of the buck stage 8.

The inverter stage 9 has three branches 15, each connected between a first inlet terminal 91 of the inverter stage 9 connected to the first outlet terminal 83 of the buck stage 8 and a second inlet terminal 92 coupled to the second outlet terminal 84 of the buck stage 8 and thus to ground. Each branch 15 has two controlled switches 16 coupled in series and an outlet terminal 9a, 9b, or 9c of the inverter stage 9 connected to one of the outlet terminals 6 of the converter device 4. The outlet terminal 9a, 9b, or 9c of the inverter stage 9 of each branch 15 corresponds to a connection node between two controlled switches 16 of the branch.

The converter device 4 also has a control unit 17 coupled to the inverter stage 9 in order to control it. The control unit 17 has a memory and is configured to operate using pre-calculated pulse width modulation with pre-calculated unchanging switching instants that are stored in the memory regardless of the frequency of rotation of the motor 3 and the voltage of the electricity network 2 connected to the converter device 4.

Figure 2:
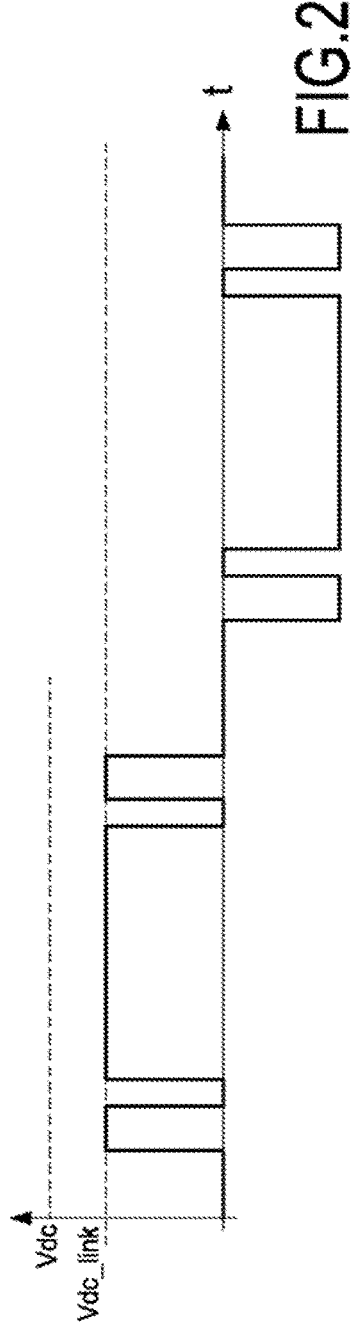
FIG. 2 shows an example of a voltage waveform supplied by the FIG. 1 converter device to the motor to which it is coupled.

As shown in FIG. 2, which shows an example voltage waveform supplied by the converter device 4 of FIG. 1 to the motor 3 to which it is coupled, the converter device 4 thus serves to supply an output voltage signal Vdc_link of amplitude that can be lower than the amplitude of the voltage Vdc delivered by the electricity power supply network 2 as a result of the buck stage 8, and of waveform that is subjected to pulse width modulation by the inverter stage 9. The reference t in the diagram represents time.

Figure 3:
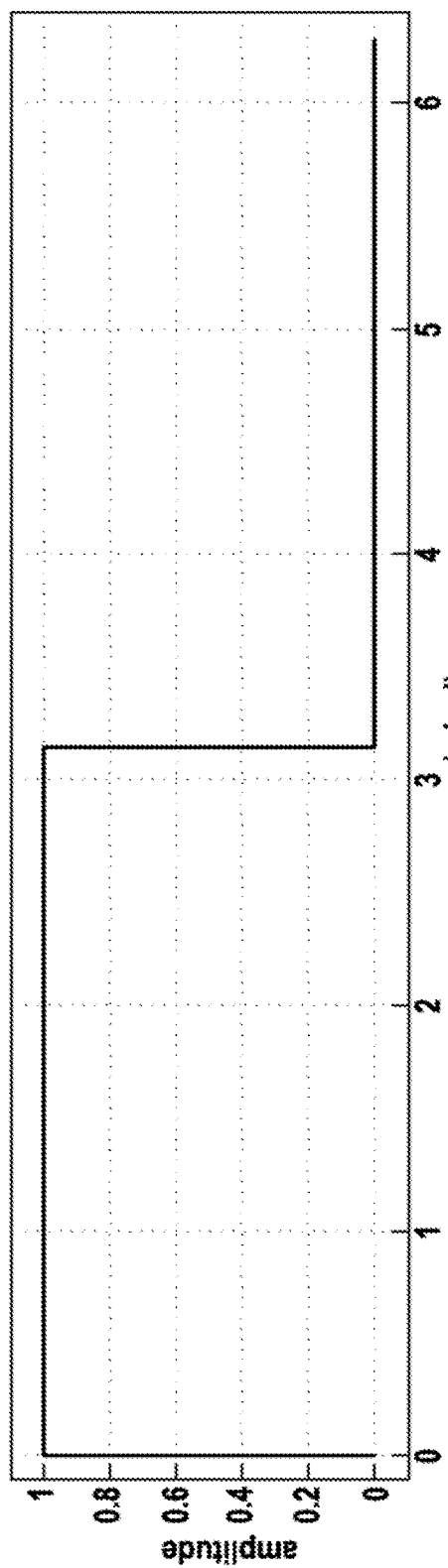
FIGS. 3 and 4 show respectively a single voltage signal from the inverter in the context of conventional 180° control, and an example of a single voltage signal from the inverter in the context of 180° control of the invention.
Figure 4:
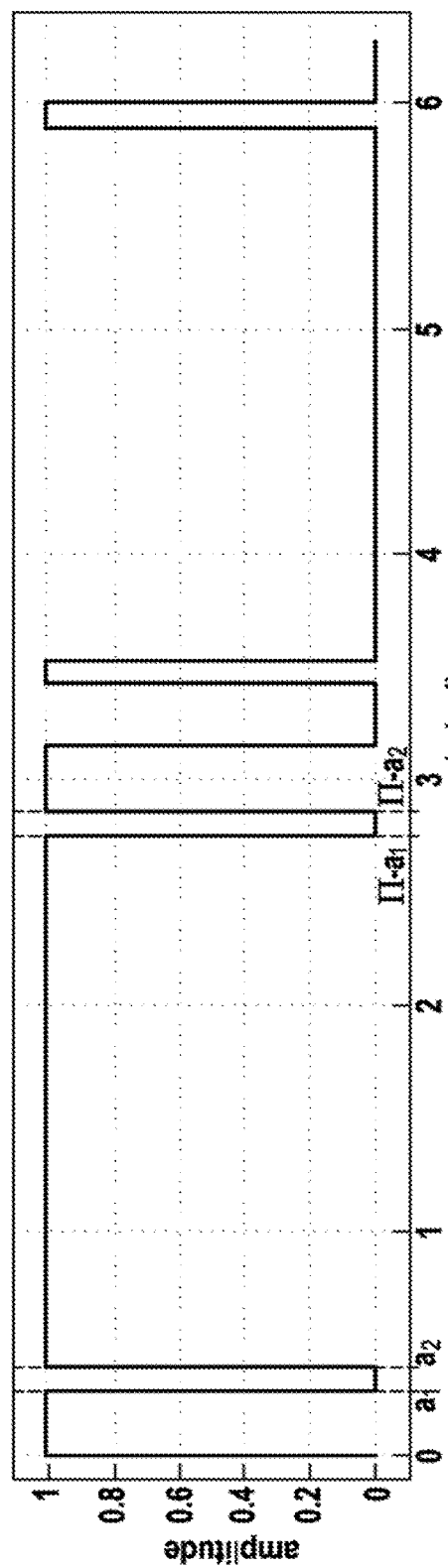

FIGS. 3 and 4 show respectively a single voltage signal from the inverter in the context of conventional 180° control, an example of a single voltage signal from the inverter in the context of 180° control of the invention, i.e. with added switching.

Starting from the waveform of the single inverter voltage, extra switching is added in order to eliminate certain troublesome harmonics, such as for example the harmonics 5, 7, 11, 13, etc. The additional switching instants a1 and a2, i.e. the angles at which the additional switching takes place, serve to eliminate certain components from the spectrum of the voltage.

The number of additional switching operations depends on the number of harmonics to be minimized or eliminated. In the example shown in FIG. 4, it is desired to eliminate harmonics 5 and 7. It is therefore necessary to have at least two additional switching angles a1 and a2, with a1 less than a2 in order to achieve such elimination. If, after performing calculations, two switching angles are found not to suffice, it is necessary to add more, e.g. four, and to see whether that suffices. The object is to minimize the number of switching operations.

Thereafter, the calculation consists in determining the values of the angles a1 and a2 for eliminating harmonics 5 and 7.

Fourier analysis of the voltage signal in FIG. 4 gives:

$$\left| \begin{array}{l} \alpha_5 = 0 = \dfrac{4}{5\pi}(1 - 2\cos(5a_1) + 2\cos(5a_2)) \\ \alpha_7 = 0 = \dfrac{4}{7\pi}(1 - 2\cos(7a_1) + 2\cos(7a_2)) \end{array} \right.$$

It is desired to eliminate $\alpha 5$ and $\alpha 7$, which leads to two non-linear equations that need to be solved in order to find the angles a1 and a2.

$$\left| \begin{array}{l} \alpha_5 = 0 = \dfrac{4}{5\pi}(1 - 2\cos(5a_1) + 2\cos(5a_2)) \\ \alpha_7 = 0 = \dfrac{4}{7\pi}(1 - 2\cos(7a_1) + 2\cos(7a_2)) \end{array} \right.$$

Figure 5:
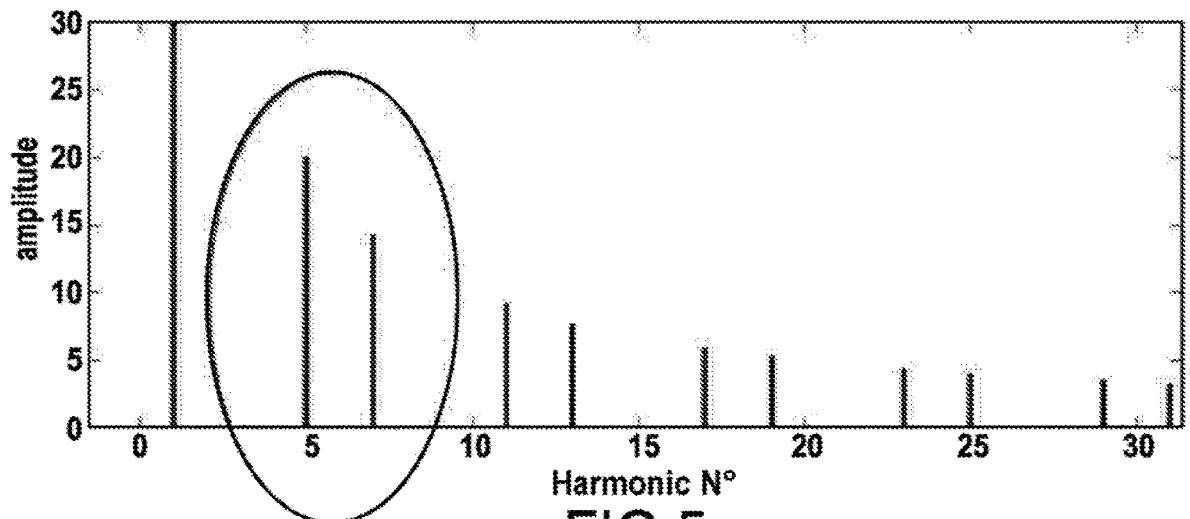
FIGS. 5 and 6 show respectively the spectral content of the single voltage in FIG. 3 and the spectral content of the modified wave of FIG. 4.
Figure 6:
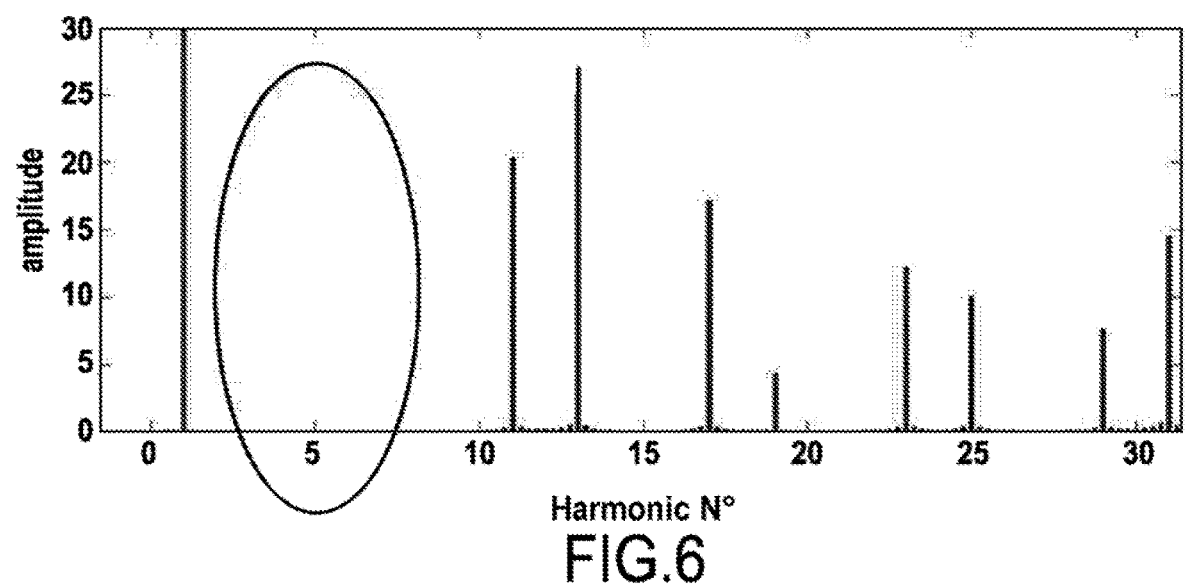

If the spectrum content of the initial single machine voltage as shown in FIG. 3 is compared with the modified waveform as shown in FIG. 4, the two graphs of FIGS. 5 and 6 are obtained. These graphs plot the amplitudes of the harmonics as percentages of the fundamental harmonic.

As can be seen on looking at FIGS. 5 and 6, and in particular the ringed portions, harmonics 5 and 7 have been eliminated from the spectrum of the single machine voltage, but higher order harmonics have been increased.

The fundamental value goes from $$\frac{2V_{dc}}{\pi} = 0.63 V_{dc}$$

to $$\frac{2V_{dc}}{\pi}(1 + 2(\cos(a_2) - \cos(a1))) = 0.59 V_{dc}.$$

This is not constraining with PAM since the amplitude of the fundamental is adjusted with the DC/DC converter, and above a certain speed, it is possible to remove these additional switching operations in order to take advantage of the full bus voltage.

With 120° control, the principle remains the same and the procedure described above remains applicable.

The invention thus makes it possible to provide a DC/AC electrical power converter device in which the chopping frequency of the converter is decoupled from the electrical frequency of the motor to which the device is electrically coupled, while serving to eliminate a major portion of the harmonics that disturb the operation of an electric machine coupled to the outlet of the device.

The invention claimed is:

1. A DC/AC electrical power converter device comprising:
   inlet terminals for electrically connecting to a DC electricity power supply network,
   outlet terminals for electrically connecting to an electric motor,
   a chopper electrical converter coupled to said inlet terminals,
   an electrical inverter coupled between the chopper electrical converter and said outlet terminals, and
   a control unit for controlling the electrical inverter and that is configured to operate using pre-calculated pulse width modulation with pre-calculated unchanging switching instants for controlled switches of the electrical inverter regardless of a frequency of rotation of the motor and of a voltage of the electricity network for connection to said device,
   wherein the switching instants are angles at which additional switching takes place to eliminate predetermined harmonics from a spectrum of voltage supplied to the motor, and the switching instants are pre-calculated to eliminate the predetermined harmonics.

2. The device according to claim 1, wherein the chopper electrical converter has buck type topology.

3. The device according to claim 1, wherein the chopper electrical converter has boost type topology.

4. The device according to claim 1, wherein the chopper electrical converter has buck-boost type topology.

5. A motor system comprising:
   a DC electricity power supply network;
   an electric motor; and
   a DC/AC electrical power converter device according to claim 1 electrically connected between the electricity power supply network and the electric motor.

6. The motor system according to claim 5, wherein the electric motor is a fuel cell compressor.

7. The motor system according to claim 5, wherein the electric motor is a fan motor.

8. The device according to claim 1, further comprising a filter coupled between the inlet terminals and the chopper electrical converter.

* * * * *